United States Patent [19]

Gramckow

[11] 4,198,912

[45] Apr. 22, 1980

[54] SLIP SHEET PALLET WITH REUSABLE PORTION

[76] Inventor: Jurgen Gramckow, 4096 Faria Rd., Ventura, Calif. 93001

[21] Appl. No.: 951,657

[22] Filed: Oct. 16, 1978

[51] Int. Cl.² .................. B65D 19/00; B65D 19/40
[52] U.S. Cl. .................... 108/51.1; 108/51.3
[58] Field of Search ............... 108/51.1, 51.3, 52.1, 108/56.1, 56.3, 55.1, 54.1; 248/346; 206/386, 599, 600; 214/10.5 R

[56] References Cited

U.S. PATENT DOCUMENTS

| | | | |
|---|---|---|---|
| 2,338,645 | 1/1944 | James | 108/55.1 X |
| 2,570,757 | 10/1951 | Bowman et al. | 108/52.1 X |
| 2,913,206 | 11/1959 | Paris | 108/51.1 X |
| 3,294,041 | 12/1966 | Lessheim | 108/51.1 |
| 4,022,135 | 5/1977 | Banman, Jr. et al. | 108/51.3 |

FOREIGN PATENT DOCUMENTS

1034104 7/1958 Fed. Rep. of Germany .......... 108/56.1
286803 2/1965 Netherlands ........................... 108/53.1

*Primary Examiner*—William E. Lyddane
*Attorney, Agent, or Firm*—Ralph B. Pastoriza

[57] ABSTRACT

The pallet comprises a reusable portion and an adjacent expendable portion. A slip sheet overlies the top surfaces of both the reusable and expendable portions but is only attached to the expendable portion. With this arrangement, a fork lift can be received under both the reusable and expendable portions and lift a stack of items on the slip sheet to a desired location. The fork lift can then be lowered until both the reusable portion and expendable portion engage the floor. The fork lift is partially withdrawn to be free of the expendable portion but still positioned beneath the reusable portion. By then lifting slightly only the reusable portion, it may be withdrawn from under the slip sheet so that the stacked items will rest on the expendable portion and slip sheet and the reusable portion of the pallet is then available for use with other expendable portions and slip sheets.

4 Claims, 5 Drawing Figures

SLIP SHEET PALLET WITH REUSABLE PORTION

This invention relates to pallets of the type designed to be moved around by fork lifts in stacking various items in warehouses and the like.

BACKGROUND OF THE INVENTION

Presently available pallets for use with forklifts generally include a rectangular piece of polywood provided with bottom skids, generally 2×4 lengths of wood running in parallel spaced relationship. The arrangement is such that a fork lift can be received between the skids to lift the pallet and transfer loads.

There are many instances in which it is desired to transfer loads such as stacked boxes or other items to a specific location wherein they will be individually removed thereafter or, alternatively, do not require further movement by means of a pallet and forklift. With presently available pallets, the load can be thusly transferred to such location but the pallet itself remains beneath the load and thus is simply "wasted" in the sense that it cannot be reused until the load thereon is removed. Many pallets can be tied up in this manner particularly where multiple tiers of loads and pallets are involved.

BRIEF DESCRIPTION OF THE PRESENT INVENTION

The present invention contemplates the provision of an improved pallet structure wherein loads can be handled in the manner normally carried out with conventional pallets but wherein a major portion of the pallet of the present invention can be reused so that entire pallet structures are not "wasted" in the sense of being rendered useless by stacked loads thereon until the loads are removed. By enabling the major portion of the pallet of this invention to be reused, there is savings not only in the costs of providing a large number of pallets in inventory but an economy in space in storing loads in particular locations.

Briefly, the pallet of this invention comprises a reusable portion and an adjacent expendable portion of substantially smaller dimensions. A slip sheet in the form of a flexible heavy paper sheet or cardboard overlies both the reusable and expendable portions but is secured only to the expendable portion. Both the reusable and expendable portions include bottom support skids which are positioned in alignment with each other.

With the foregoing arrangement, a forklift can be received under both the reusable portion and expendable portion for lifting a stack of items or other loads positioned on the slip sheet. The load can then be transferred to a desired location and the forklift lowered so that both the reusable and expendable portions of the pallet rest on the floor. The forklift is then withdrawn slightly to be free of the expendable portion and only underlie the reusable portion. By then lifting the reusable portion slightly, it may be simply slid from under the slip sheet so that the stacked items will rest on the slip sheet and expendable portion. The reusable or main portion of the pallet can then be reused in cooperation with other expendable portions and slip sheets for transferring of other loads.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
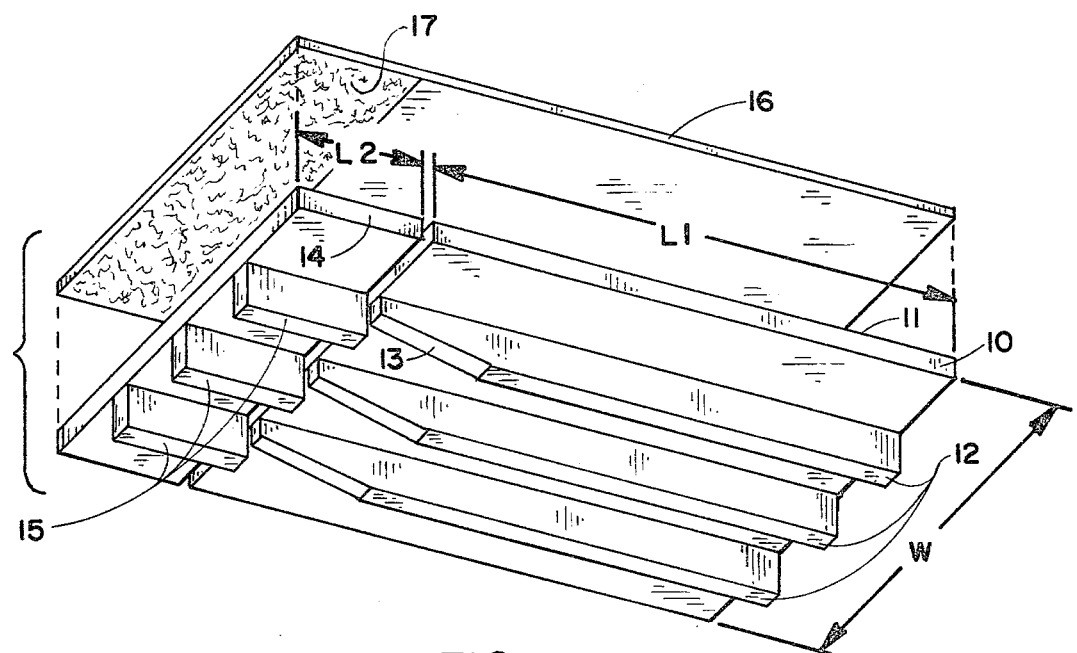
FIG. 1 is an underside exploded perspective view of the slip sheet pallet with reusable portion in accord with the present invention.

Referring first to FIG. 1, the pallet of this invention includes a reusable pallet portion 10 of given length L1 and width W. This portion of the pallet normally comprises a 1" thick piece of plywood and is provided with a smooth top flat surface 11. Also provided are bottom support skids 12, each of which in accord with this invention, has its front end cut at an angle to define a sloping surface such as indicated at 13. The purpose for this construction will become evident as the description proceeds.

Cooperating with the reusable pallet portion 10 is an expendable pallet portion 14 adjacent to the front end of the reusable pallet portion but not attached thereto. This expendable pallet portion has a shorter length indicated at L2 than the given length L1 but is of substantially the same width as the given width W. The expendable pallet portion 14 similarly is provided with bottom support skids 15. These skids are not cut at an angle but may be simply rectangular 2×4 sections positioned in alignment with the skids 12 of the reusable pallet portion 10, all as shown.

Indicated in exploded view above the top surface 11 of the reusable pallet portion 10 and the top surface of the expendable pallet portion 14 is a slip sheet 16 which may comprise heavy paper, cardboard, or similar material. The dimensions of the slip sheet 16 are such that it will overlie both top surfaces of the reusable pallet portion 10 and expendable pallet portion 14.

As indicated in FIG. 1, the slip sheet 16 has a forward underside portion 17 arranged to be secured to the top surface of the expendable pallet portion 14, the remaining underside portion of the slip sheet simply overlying the smooth top surface of the reusable pallet portion without being attached thereto.

Figure 2:
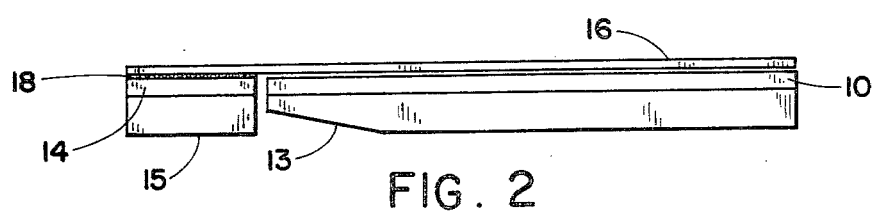
FIG. 2 is a side elevational view of the assembled pallet of FIG. 1.

The foregoing securement may be by simple adhesive or nails or tacks schematically indicated at 18 in FIG. 2. It will be evident in FIG. 2 that the length of the expendable portion 14 is less than one fourth the overall length of the reusable portion and thus constitutes a minor portion of the overall pallet structure.

Figure 3:
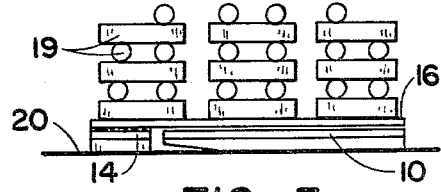
FIG. 3 is a schematic illustration of a load of stacked items on the pallet of this invention.

Referring now to FIG. 3, with the pallet assembled as shown in FIG. 2, various loads indicated by the stacked items 19 may be deposited on the slip sheet 16 with the reusable pallet portion 10 and expendable pallet portion 14 resting on a floor 20 such as the floor of a warehouse.

When it is desired to move the load of stacked items and deposit the same in a new location, the conventional forklift can be used with the fork tines being received between the aligned bottom support skids of both pallet portions 10 and 14.

Figure 4:
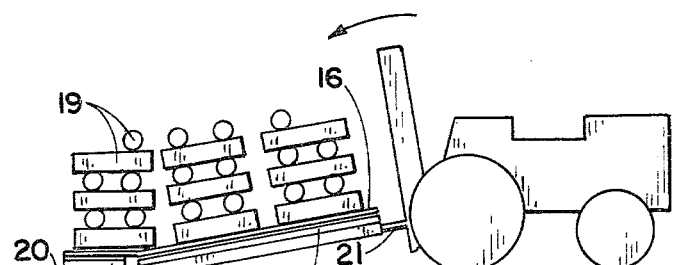
FIG. 4 illustrates the manner in which the stacked items of FIG. 3 are deposited at a different location by a forklift.

When the forklift has arrived at the new location where the stacked items 19 are to be deposited, the pallet portions are both lowered by the forklift to again engage the floor 20. The forklift is then retracted a distance corresponding to the length L2 described in FIG. 1 of the expendable pallet portion 14 so that the fork tines will only be disposed under the reusable pallet portion 10. The forklift is then operated to raise only the reusable pallet portion 10 slightly free of the floor 20 as illustrated in FIG. 4. In this respect, the forklift may be tilted forwardly slightly in this operation as indicated by the arrow.

By providing the sloping surface 13 on the front ends of the bottom support skids for the reusable portion 10 as described in FIG. 1, the front end portions of these skids will be free of the floor 20 during the tilting operation. In FIG. 4, the forklift is indicated at 21 partially withdrawn so that the reusable portion 10 can be lifted slightly and tilted as described.

The forklift is then completely retracted carrying the reusable pallet portion 10 with it so that it is simply slid from beneath the slip sheet 16. The result is that the stacked items 19 making up the load will then be deposited on the floor 20 simply resting on the slip sheet 16 and expendable pallet portion 14.

Figure 5:
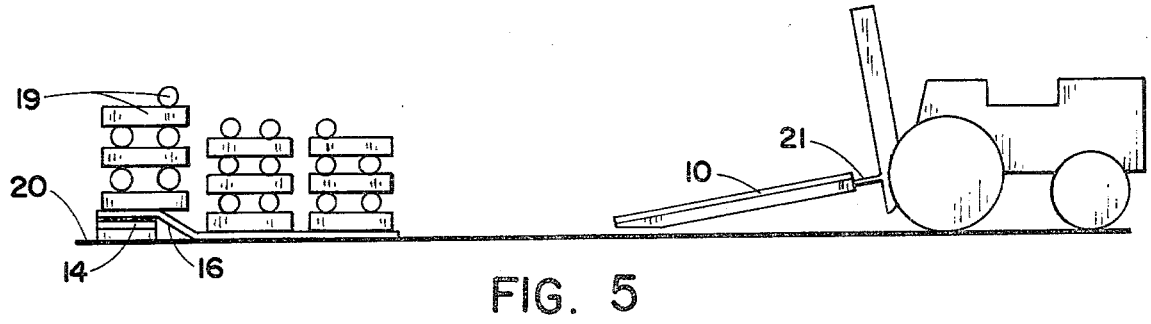
FIG. 5 is a view similar to FIG. 4 but illustrating separation of a reusable portion of the pallet from under the load in completing the repositioning of the stacked items.

The foregoing is illustrated in FIG. 5 and it will be clear that the reusable pallet portion 10 is now free and available for cooperation with other expendable pallet portions and slip sheets.

Since the reusable pallet portion 10 constitutes the major portion of the overall pallet, its reuse or recycling as described provides definite advantages over the conventional type pallets. More particularly, it is not necessary to maintain a large inventory of pallets since the major portions of the pallet of this invention can be reused. Moreover, there is not "wasted" pallets in the sense that they are unavailable when positioned under stacked oads, all as described heretofore.

From all of the foregoing, it will thus be evident that the present invention has provided an improved pallet construction having distinct advantages and uses over conventional type pallets.

I claim:

1. A pallet comprising a reusable portion and adjacent expendable portion; and a slip sheet secured to the expendable portion and overlying the reusable portion, said reusable portion and expendable portion having bottom support skids in alignment so that a fork lift can be received under both said reusable portion and expendable portion for lifting a stack of items on said slip sheet.

2. A pallet including, in combination:
    (a) a reusable pallet portion of given length and width having a smooth top flat surface and bottom support skids;
    (b) an expendable pallet portion of shorter length than said given length and of substantially the same width as said given width positioned in front of said reusable pallet portion and having bottom support skids in alignment with the bottom support skids on said reusable pallet portion; and
    (c) a slip sheet overlying said reusable pallet portion and expendable pallet portion, said slip sheet having a forward underside portion secured to the top surface of said expendable pallet portion, the remaining underside portion simply overlying said smooth top surface of sid reusable pallet portion without being attached thereto whereby the pallet can be loaded by stacking items on top of said slip sheet, moved by a fork lift received between the aligned skids of both said reusable pallet portion and expendable pallet portion, and unloaded by said fork lift by lowering the pallet to the floor, withdrawing the fork lift a distance corresponding to the length of said expendable pallet portion so that the fork lift is only under the reusable pallet portion, lifting the reusable pallet portion free of the floor and withdrawing the usable pallet portion from under the slip sheet so that the load of stacked items rests on the expendable pallet portion and slip sheet and the reusable pallet portion is available for cooperation with another expendable pallet portion and slip sheet.

3. A pallet according to claim 2, in which the bottom support skids of said reusable pallet portion have their front ends cut at angles to define a sloping surface so that said fork lift can be tilted forwardly slightly after lifting only said reusable pallet portion without the front ends of said skids touching the floor to facilitate removal of the usable pallet portion from beneath said slip sheet.

4. A pallet according to claim 3, in which the length of said expendable pallet portion is less than one fourth said given length of said reusable pallet portion.

* * * * *